United States Patent Office 3,655,600
Patented Apr. 11, 1972

3,655,600
FLAME RESISTANT MATERIALS AND METHODS FOR PRODUCING SAME
Stephen S. Stevens, Encino, Calif., assignor of fractional part interest to Morris Sankary
No Drawing. Filed Jan. 13, 1970, Ser. No. 2,690
Int. Cl. C08j 1/30
U.S. Cl. 260—2.5 B          13 Claims

ABSTRACT OF THE DISCLOSURE

A flame resistant material formed by dry blending a combination of finely powdered alkali metal silicate, an inorganic filler and a plurality of porous expanded polymer beads or granules with a minor amount of an alkali stable surfactant which wets the surfaces of the beads and permits the adhesion of the powdered alkali metal silicate thereto, such as a long chain alkyl phenoxy polyethoxy ethanol, and thereafter coalescing said alkali metal silicate with heat to form an integral porous structure.

BACKGROUND OF THE INVENTION

Field of invention

This invention relates to a low specific gravity, structurally stable flame resistant material which is characterized by good insulating and thermal resistance and flame proofing properties, and to methods of preparation thereof.

Description of prior art

It is now well known in the prior art to form light weight flame resistant insulation by admixing or congealing into an integral structure, porous granules or beads of a polymeric material, such as polystyrene, polyurethane, or the like, with an inorganic or organic settable binder. These materials have found particularly wide application in the preparation of such building elements as partitions, floors, floor underlays, sound insulating wall boards, and the like, as well as for electrical, thermal, and impact shock-resistant elements for industrial purposes.

While good results have been obtained in the prior art by preparing such materials with organic settable binders such as urea-formaldehyde resin, or with inorganic binders, such as Portland cement, calcium aluminate, gypsum, mortar, or the like, each of these systems has been found to have several serious drawbacks which render them at least partially undesirable for various commercial applications. Particularly, many of these systems, such as the organic binders, and the cementious materials have been found to deteriorate and become structurally unstable at undesirably low temperatures, thereby limiting their range of usefulness to applications in which structural stability is only required at temperatures below about 900° F. Other such systems partially deteriorate at moderate temperatures producing toxic, irritating or obnoxious gases.

In an attempt to alleviate this difficulty, the art has focused on the use of alkali metal silicate binders which are known to be heat resistant and possesss good physical properties, even at elevated temperatures above about 1,400° F. Moreover, it is known that by admixing certain alkali metal silicates with the clay fillers that structural stability can be increased to temperatures as high as 2,500° F.

Although a substantial amount of attention has been given to forming flame resistant insulation materials by using an alkali metal silicate binder with the foamed or expanded beads and granules, the techniques developed for achieving this resultant primary use an aqueous media for distributing the settable binder around the surface of the bead or granule. For instance, in U.S. Pat. 3,434,980, to Stastny et al., there is disclosed a technique whereby an aqueous solution or suspension of the alkali metal silicate is admixed with a plurality of foamed or fully expanded beads. The water content of the solution is thereafter reduced by a low temperature-low pressure technique so as to form an integral residue of the polymer beads in the hardened alkali metal silicate binder. This technique, however, has not been found to be an altogether satisfactory solution for practical industrial applications, both because the process of removing the water at low temperatures is a time-consuming procedure, often taking as much as several hours or even several days, and because the end product is frequently marred by cracks and "locked-in" water. While it is not completely understood, it is believed that many of these difficulties are related to the fact that as the water at the surface of the residue is removed, the alkali metal silicate tends to set up at the surface forming a hard skin which must be penetrated by the water entrapped in the deeper thicknesses of the residue. This problem has been found to become especially acute as the residue is increased beyond one inch in thickness.

While it has been thought desirable to eliminate the shortcomings of the prior art process and the cracking or splitting of the alkali metal silicate binder, prior to the present invention, it was believed that the only manner of obtaining an adequate coating of the polymer beads and adequate setting of the silicate was to use a liquid binder. Moreover, the only solution the art has recognized for alleviating the cracking problem has been the addition of such organic substances to the aqueous mixture as various carbohydrates, cellulose ethers or polyglycols. This alternative, however, has been found to be only partially satisfactory and is, in fact, somewhat self-defeating in that these organic materials often exert an adverse effect on the physical stability of the resulting product.

A need exists, therefore, for a flame resistant material which is structurally stable at very high temperatures and which is free of deleterious cracking and splitting in the settable binder and which can be produced in a rapid and efficient manner without the difficulties attendant in the removal of water from the aqueous solution of the alkali metal silicate.

SUMMARY OF THE INVENTION

It is an object of this invention, therefore, to form a structurally stable flame resistant and insulating material.
It is further an object of this invention to form a flame resistant material which is free of deleterious cracks in the binder and which is free of entrapped water.
Another object of this invention is to provide a flame resistant material which will not produce toxic, irritating or obnoxious fumes or smoke at any temperature of expected use.
A still further object of this invention is to provide a technique for rapidly forming an insulating material with a high temperature resistant alkali metal silicate settable binder, whereby the necessity of removing water from the composition is avoided.

These and other objects have now herein been provided by the technique of dry blending a composition of dry, finely-powdered alkali metal silicate, an inorganic filler, and a plurality of porous expanded polymer beads or granules with a minor amount of an alkali stable surfactant which is capable of wetting the surfaces of said beads and which is capable of providing adhesion of the powdered alkali metal silicate to the bead surfaces, and thereafter coalescing the alkali metal silicate with heat at a temperature which is sufficient to cause fusion and hardening of the silicate but below the softening point of the polymer beads.

DETAILED DESCRIPTION OF PREFERRED EMBODIMENTS

In the process of the present invention, a dry blended mixture of an alkali metal silicate, a plurality of foamed or pre-expanded beads or granules and a suitable alkali stable surfactant is first formed by mixing the ingredients in a suitable binder at a temperature of up to 170° F. until the beads or granules are completely covered. The dry blend is then transferred to a preheated mold and the polystyrene beads rae further expanded thereby resulting in a fused product.

The alkali metal silicate settable binder is preferably used in the form of a finely-divided powder having a particle size of between about 50 and 100 microns. The particle size, however, is not considered to be critical and larger or smaller particles can be used with good results. The powder may contain as much as 16% to 20% by weight of water of hydration as in commercially available "dry" alkali metal silicate.

The ratio of the alkaline oxide to the silicon dioxide in the solid alkali metal silicate may be varied within wide limits of from 1:2.0 to 1:4.0, although it is desirable to use commercially available materials generally having a ratio of about 1:3.3.

Among the alkali metal silicates which are useful within the context of this invention may be mentioned sodium silicate and potassium silicate.

The pre-expanded porous polymer beads or granules can be formed from a wide variety of materials including styrene containing homopolymers or copolymers formed with styrene and a comonomer such as acrylonitrile, acrylic acid, butadiene, or the like. Other suitable polymers include the polyurethanes, polyvinyl chloride, polyvinylidene chloride, or copolymers with vinyl chloride or vinylidene chloride. The pre-expanded beads can be prepared by any of the well-known conventional processes such as by steeping particles of the polymeric material with a suitable blowing agent, such as pentane, expanding the beads to the desired size, and thereafter removing the excess blowing agent. Although the particle size of the pre-expanded porous beads used in the present invention is not critical, good results are obtained by using beads which are sufficiently large to pass through a U.S. Sieve No. 10 or sufficiently small to pass through a U.S. Sieve No. 60.

Alternatively, a fully-foamed block of polymer material can be cut into granules within the same size range. For example, scrap foam of polyurethane or polystyrene may be cut into a suitable granule size and used in the process of this invention.

One group of alkali resistant surfactant materials which has been found to be particularly adaptable to the present invention can be represented by the formula

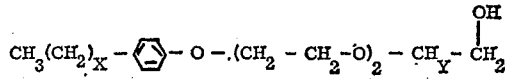

wherein X is an integer of from 7 to 20 and Y is an integer of from 10 to 15. Exemplary of such surfactants include the biodegradable, liquid anhydrous, 100% active, non-ionic surface active agent of water-soluble isooctyl phenoxy polyethoxy ethanol having a viscosity of 200 to 400 centipoises at 25° C.

An inorganic filler may be added to the composition to impart particular properties to the insulating material. For example, where the material is intended to be used at extremely high temperatures, clay type fillers, such as magnesium oxide can be added in a proportion to the silica sufficient to form forsterite. Where particularly rapid setting of the alkali metal silicate is desired, 1% to 10% by weight of sodium silica fluoride may be added to the composition. Other fillers which may be used include talc, calcium carbonate, asbestos powder, glass powder, quartz powder, zinc carbonate, zinc oxide, or aluminum hydroxide. Alo flame retardants such as the organic or inorganic chlorides, bromides, or phosphorus containing compounds can be added. For instance, one good flame retardant composition includes the mixture of chloroparaffin powder and antimony trioxide.

It is also advantageous to add a waterproofing agent when the flame resistant material is intended for either outdoor use or in moist atmospheres. For this purpose, aluminum chloride has been found to be particularly suitable, although other such agents may also be used.

One very desirable aspect of the present invention is that the heat resistance of the ultimate product can readily be varied simply by varying the ratio of the alkali metal silicate to the polymer beads. By increasing the quantity of silicate, the degree of heat resistance is increased and hence only that quantity of silicate need be used as is required by the highest temperature of expected use.

In formulating the composition, however, the alkali metal silicate should be used in an amount exceeding the weight of the polymer beads, i.e., in a weight ratio exceeding 1 to 1. Good results have been obtained when using ratios of from 1 to 1 to 10 to 1.

The quantity of inorganic filler which may be used in the composition depends upon the particlular filler and the particular application for which the material is intended to be used. In general, the filler should be used in an amount of from about 25% to 70% based on the weight of the total mixture. The exact amount to be used, however, depends largely upon the requirements of the particular product, and upon the nature of the filler.

The surfactant can be used in an amount of from about 1% by weight to 30% by weight, although the specific amount is dependent upon the desired coating thickness.

After forming the above composition by dry-blending at an elevated temperature, the composition is congealed by simply exposing it to a heated inert gas such as carbon dioxide or nitrogen for a period of time and at a temperature sufficient to achieve the desired result. This can advantageously be accomplished by inserting the dry blend in a pre-heated mold and flushing the mold with the heated gas. In hardening a 1 square foot panel, 1 inch thick, hardening is accomplished within 1 minute to 15 minutes at temperatures of between about 100° F. to 500° F.

As can be readily appreciated, one of the advantages of the present invention is the especially quick hardening time of the settable ingredient in comparison with the prior art aqueous solution technique, in which water must be evaporated at low temperatures and low pressures. Moreover, hardening can be accomplished at either a high or low temperature, unlike the prior art techniques which required low temperatures only. Also, as can be readily appreciated, since water is not removed, there is no danger of cracking or splitting of the binder and the binder dries evenly throughout the volume of the composition.

To further insure quick setting times and a crack-free product, as indicated above, it is desirable to admix sodium silicofluoride as an additional effective setting agent.

By the use of this type of setting agent, any water released by the surfactant becomes chemically absorbed by the silicofluoride and does not remain entrapped in the final composition.

When the composition of the present invention is subjected to flame or high temperatures, the organic material decomposes into carbon, leaving a skeleton, or porous structure of fused silica which remains thermally stable until the melting point of the inorganic components.

Having generally described the present invention, a more detailed understanding can be obtained by reference to several specific examples, which are not intended to be construed as limiting of the invention, except as recited in the appended claims. Unless otherwise specified, all ingredients specified in the examples are expressed in terms of parts by weight.

EXAMPLE 1

20 parts by weight of commercially available 80% expanded pentane steeped polystyrene beads were placed in an agitator mixture having a visual monitoring port. 100 parts by weight of 100% active non-ionic water-soluble isooctyl phenoxy polyethoxy ethanol having a viscosity of 200 to 400 centipoises at 25° C. was added to the agitator so as to completely cover the beads. A small amount of an organic dye was added to the agitator to facilitate visual assurance of the complete coverage of the beads. The mixture was agitated and hot air at a temperature of about 170° F. was forced into the agitator mixer so as to maintain the mixture at a temperature of about 150 to 160° F. 500 parts by weight of sodium silicate $$(Na_2O.3.33SiO_2)$$

was introduced into the agitator and agitation was continued for 10 minutes. After this period, the powdered silicate appeared to uniformly adhere to the beads. The dry blend was then transferred into a suitable mold which had been preheated to about 170° F. The mold was closed, and the temperature within the mold was raised by passing hot air therethrough in order to fully expand the polystyrene beads. After about 6 minutes, a panel of about 1 square foot in area and 1 inch in thickness was obtained. Upon testing, it was found that the panel had a normal compression of 83 p.s.i. Subjecting the panel to a 10 p.s.i. flame, it was found that the panel was able to withstand temperature of up to 1,700° F. for 75 minutes.

EXAMPLE 2

The procedure of Example 1 was repeated except using the following composition:

20 parts by weight of 80% expanded polystyrene beads
500 parts by weight of $Na_2O.3.33SiO_2$ pwd.
200 parts by weight of the wetting agent of Example 1
500 parts by weight of kaolin clay Upon testing a 1 square foot panel 1 inch thick of this material, similar results to those of Example 1 were obtained.

EXAMPLE 3

The procedure of Example 1 was again repeated except using the following composition:

20 parts by weight of 80% expanded polystyrene beads
500 parts by weight of $K_2O.3.92SiO_2$
200 parts by weight of the surfactant of Example 1
500 parts by weight of kaolin clay Upon testing a 1 square foot panel, 1 inch thick, similar results to those of Example 1 were obtained.

EXAMPLE 4

The procedure of Example 1 was repeated except using the following composition:

80 parts by weight of 80% expanded polystyrene beads
300 parts by weight $Na_2O.3.33SiO_2$
250 parts by weight of the surfactant of Example 1
250 parts by weight of aluminum hydrate Upon testing a 1 square foot panel 1 inch thick of this material, a flame resistance of 1700° F. for 38 minutes was obtained.

EXAMPLE 5

The procedure of Example 1 was repeated except using the following composition:

50 parts by weight of 80% expanded polystyrene beads
100 parts by weight of $Na_2O.3.33SiO_2$
200 parts by weight of the surfactant of Example 1
200 parts by weight of magnesium hydroxide Upon testing a 1 square foot panel, 1 inch thick of this material, similar results to those of Example 1 were obtained.

EXAMPLE 6

The procedure of Example 1 was repeated, except using the following composition:

50 parts by weight of granulated polyurethane form
500 parts by weight of $Na_2O.3.33SiO_2$
400 parts by weight of the surfactant of Example 1
100 parts by weight of powdered ceramic cement Upon testing a 1 square foot panel, 1 inch thick of this material a flame resistance of 2200° F. for 2 hours was obtained. The normal compression strength was found to be 110 p.s.i.

EXAMPLE 7

The procedure of Example 1 was repeated except using the following composition:

30 parts by weight of 80% expanded polystyrene beads
400 parts by weight of $Na_2O.3.33SiO_2$
400 parts by weight of the surfactant of Example 1
500 parts by weight of powdered asbestos filler Although the foregoing examples all describe the use of 80% pre-expanded polymer beads which are commercially available under the tradename "Dylite," other pre-expanded beads, such as those having a degree of pre-expansion of from about 30%–100%, can also be used with good results. Likewise, although "Dylite" beads are expanded by use of pentane as the blowing agent, other commercially available blowing agents can be equally used.

The flame resistant material of the present invention was compared with that formed by the aqueous alkali metal silicate solution technique described in Stastny et al. patent, supra. Specifically, a 1 foot by 1 inch thick panel formed as described in Example 1 was compared with a panel formed by admixing an aqueous solution of 500 parts by weight $Na_2O.3.33SiO_2$ with 20 parts by weight of 80% pre-expanded polystyrene beads. The water content of the suspension so formed was removed by evaporation at a low temperature sufficient to permit complete expansion of the partially expanded beads.

The panels were then each subjected to ASTM Test E-119 for one hour at temperatures of up to 1200° F. At the termination of this procedure, the panels were examined under 300× magnification. It was found that the organic materials in both instances were substantially decomposed leaving a skeleton structure of the coalesced silicate. The panel formed by the present invention was found to be structurally uniform with small substantially uniform cells and substantially uniform cell wall thicknesses. In contradistinction, the panel formed by the aqueous silicate solution technique had a non-uniform cell structure and a non-uniform cell wall thickness. Large holes in the structure were observed where the structure had failed.

The results of this test showed that the polystyrene beads were uniformly coated with the alkali metal silicate by the technique of the present invention whereas they were substantially non-uniformly coated by the aqueous solution technique. Under use conditions, the panels formed by the latter technique failed both structurally and in flame resistance characteristics, unlike those prepared by the techniques of the present invention.

It should be clearly understood that many modifications and changes can be made to the present invention without departing from the spirit or scope thereof. Accordingly, what is claimed and intended to be covered by Letters Patent of the United States is:

1. A proces for providing a flame resistant material characterized by good insulating and high temperature resistance, good flame proofing properties, and having a low specific gravity which comprises:

dry blending a combination of dry, finely-powdered alkali metal silicate, an inorganic filler and a plurality of porous, expanded polymer beads with a minor amount of an alkali stable surfactant capable of wetting the surfaces of said beads and adhering said powdered alkali metal silicate thereto, coalescing said alkali metal silicate with heat at a temperature sufficient to cause hardening of said silicate, and to form a porous integral flame resistant structure.

2. The process of claim 1, wherein said surfactant is characterized by the formula

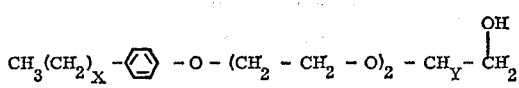

wherein X is an integer of from 7 to 20 and Y is an integer of from 10 to 15.

3. The process of claim 1, wherein the composition is coalesced by heating said composition in a gaseous atmosphere at a temperature of from about 100° F. to 500° F.

4. The process of claim 3, wherein said polymer beads are partially expanded beads and whereas the mixture is coalesced at a temperature sufficient to cause complete expansion of the partially expanded beads.

5. The process of claim 1, wherein said porous expanded polymer is selected from the group consisting of styrene polymers, vinyl chloride polymers, polyurethane and vinylidene chloride polymers.

6. The process of claim 1, wherein a silicofluoride setting agent is admixed with a dry-blended composition prior to coalescing.

7. The process of claim 1, wherein a water proofing agent is dry-blended with the composition.

8. The process of claim 7, wherein the water proofing agent is aluminum chloride.

9. A flame resistant material characterized by a low specific gravity and good insulating and high temperature resistance, and which possesses good flame proofing properties, which comprises:

a plurality of expanded polymer beads which are homogeneously coated and bonded into a matrix of a coalesced, dry, alkali metal silicate and a surface active agent which is capable of providing adhesion between the alkali metal silicate and said polymer beads.

10. The flame resistant material of claim 9, wherein the surface active agent has the formula

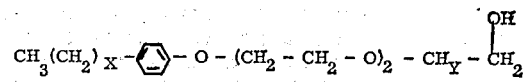

wherein X is an integer of from 7 to 20 and Y is an integer of from 10 to 15.

11. A flame resistant material of claim 10, wherein said matrix additionally contains a silicofluoride setting accelerant.

12. A flame resistant material of claim 11, wherein said matrix additionally contains a desizing agent.

13. A flame resistant material of claim 10, wherein said polymer is selected from the group consisting of styrene polymers, vinyl chloride polymers, polyurethane, and vinylidene chloride polymers.

References Cited
UNITED STATES PATENTS

| | | | |
|---|---|---|---|
| 3,429,836 | 2/1969 | Stastny et al. | 260—2.5 B |
| 3,434,980 | 3/1969 | Stastny et al. | 260—2.5 B |
| 3,547,840 | 12/1970 | Stastny et al. | 260—2.5 B |
| 3,272,765 | 9/1966 | Sefton | 260—2.5 B |
| 3,361,688 | 1/1968 | Bonitz et al. | 260—2.5 B |

MURRAY TILLMAN, Primary Examiner

M. FOELAK, Assistant Examiner

U.S. Cl. X.R.

117—100 A; 260—2.5 AK